United States Patent
Dulancy et al.

(10) Patent No.: US 6,923,305 B2
(45) Date of Patent: Aug. 2, 2005

(54) CLUTCH DRIVEN DISK WITH PREDAMPER

(75) Inventors: Holly B. Dulancy, Canton, MI (US); Michael L. Bassett, Auburn, IN (US)

(73) Assignee: Eaton Corporation, Cleveland, OH (US)

( * ) Notice: Subject to any disclaimer, the term of this patent is extended or adjusted under 35 U.S.C. 154(b) by 0 days.

(21) Appl. No.: 10/639,364

(22) Filed: Aug. 12, 2003

(65) Prior Publication Data

US 2005/0034956 A1 Feb. 17, 2005

(51) Int. Cl.[7] ............................................. F16D 13/68
(52) U.S. Cl. ............................. 192/213.11; 192/70.17
(58) Field of Search ..................... 192/213.1–213.31, 192/70.17; 464/68

(56) References Cited

U.S. PATENT DOCUMENTS

| | | | |
|---|---|---|---|
| 4,177,888 A | * 12/1979 | Arrowsmith | 192/213.12 |
| 4,596,324 A | * 6/1986 | Braun | 192/213.12 |
| 4,606,451 A | * 8/1986 | Martinez-Corral et al. | 192/213.12 |
| 4,669,593 A | * 6/1987 | Raab et al. | 192/213.11 |
| 6,035,993 A | 3/2000 | Gochenour | |
| 6,105,744 A | 8/2000 | Szadkowski et al. | |
| 6,484,860 B1 | 11/2002 | Bassett | |
| 6,488,139 B1 | * 12/2002 | Yamamoto | 192/213.22 |

* cited by examiner

Primary Examiner—Richard M. Lorence
(74) Attorney, Agent, or Firm—Rader, Fishman & Grauer PLLC

(57) ABSTRACT

A driven disk is disclosed that includes an inner hub and an outer hub secured to at least one cover plate. The driven disk includes a predamper having a driving element and a driven element. The driving element includes the cover plate and the driven element includes a predamper driven plate fixed to the inner hub. The cover plate includes a number of apertures and the predamper driven plate includes a number of sockets at least partially aligned with the apertures in the cover plate. An energy storage member is disposed within the apertures in the cover plate and the sockets in the predamper driven plate for absorbing torque as a function of relative rotation between the inner hub and the outer hub.

7 Claims, 3 Drawing Sheets

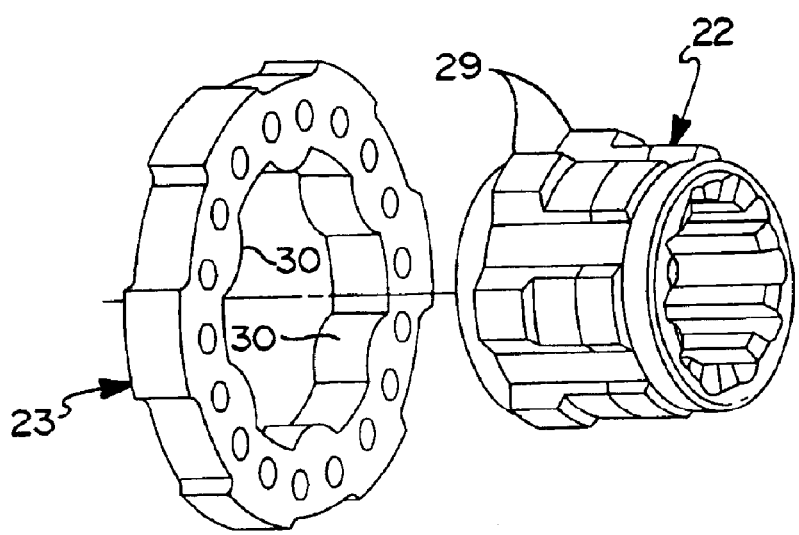
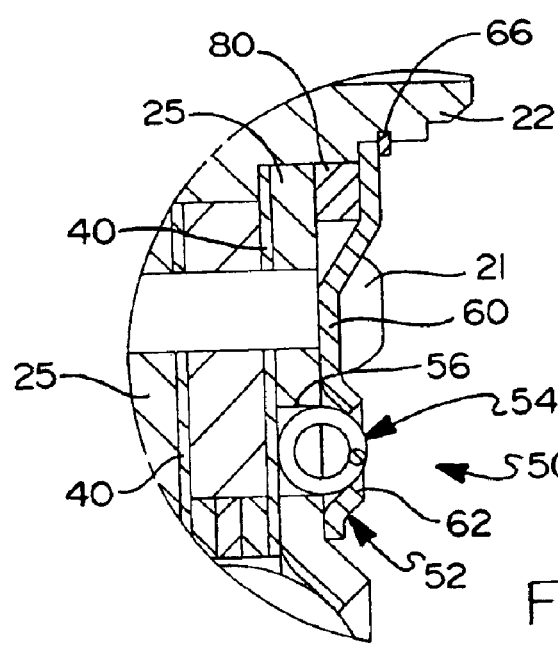

CLUTCH DRIVEN DISK WITH PREDAMPER

BACKGROUND OF THE INVENTION

1. Field of the Invention

This invention relates in general to friction clutches and in particular to predampers for clutch driven disks.

2. Description of the Related Art

Clutches are well known devices used to selectively connect a source of rotational power to a driven mechanism. For instance, in a vehicle drive-train system, a clutch is used to drivingly connect an engine to a transmission. When the engine is drivingly connected with the transmission by the clutch, vibrations are transmitted through the clutch and into the transmission and other drive-train components, producing undesirable operating conditions, such as gear rattle.

Clutches generally include a clutch hub engaged for rotation with a transmission input shaft and a clutch disk selectively engaged for rotation with the engine flywheel. To reduce the transmission of vibrations, clutches typically employ a plurality of compression damping springs between the clutch hub and the clutch disc. These springs are typically disposed in spring pockets circumferentially located around the clutch hub. Compression of the damping springs is limited by stops disposed between the hub and the clutch disk, limiting relative rotation therebetween. The damping springs provide some degree of isolation between the engine and transmission to reduce the transmission of vibration due to engine firing pulses and other engine speed fluctuations. However, vibrations can still be transmitted through the damping springs to produce gear rattle.

One solution to further reducing the transmission of vibrations has been to split the hub into an inner hub directly connected to the transmission input shaft and an outer hub connected to the clutch disc through the damping springs. The inner hub and outer hub are configured to provide a predetermined amount of rotative lash between the two parts. A predamper is placed between the inner hub and the outer hub. The predamper has springs of particular rates and preload characteristics selected to further damp out vibrations that can induce gear rattle.

One known predamper configuration includes driving and driven elements; wherein the driven element is rotatably fixed to the inner hub and the driving element is rotatably fixed to the outer hub with a plurality of compression predamper springs disposed therebetween. The predamper springs are generally much smaller than, and of a much lower spring rate than, the damping springs disposed between the outer hub and the clutch disc and typically require end caps that facilitate the retention of predamper springs within the predamper. While this design has proven functionally successful, the additional components undesirably increase the axial length of the clutch package and inhibit the ability to incorporate a hysteresis component into the predamper for further torsional damping.

SUMMARY OF THE INVENTION

A driven disk is disclosed that includes a rotatable disk assembly including a disk plate. The driven disk also includes a hub assembly having an inner hub and an outer hub rotatable relative to the inner hub and secured to at least one cover plate. The hub assembly is rotatable relative to the disk assembly. The driven disk also includes a predamper having a driving element and a driven element. The driving element includes the cover plate and the driven element includes a predamper driven plate fixed to the inner hub. The cover plate includes a number of apertures and the predamper driven plate includes a number of sockets at least partially aligned with the apertures in the cover plate. An energy storage member is disposed within the sockets in the cover plate and the predamper driven plate. The energy storage member absorbs torque as a function of relative rotation between the inner hub and the outer hub. Among other things, the predamper of the present invention reduces the axial width of the driven disk, particularly when compared to the prior art, and allows the optional incorporation of a hysteresis component into the predamper if desired.

BRIEF DESCRIPTION OF THE DRAWINGS

Embodiments of the invention will now be described, by way of example, with reference to the accompanying drawings, wherein:

FIG. 3 is an exploded view of a hub assembly according to an embodiment of the invention; and FIG. 4 is a detailed cross-sectional view of the driven disk shown in FIG. 2.

DETAILED DESCRIPTION

Figure 1:
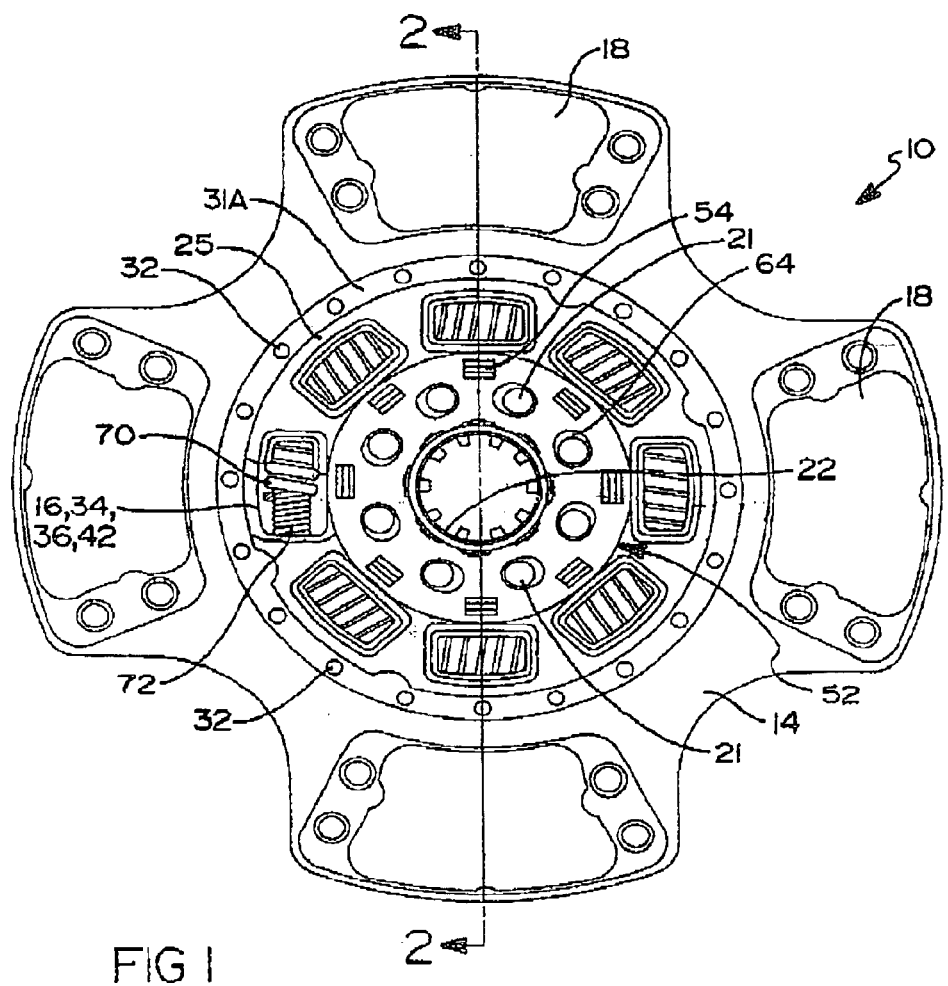
FIG. 1 is a front view of a driven disk according to an embodiment of the present invention.

Referring now to the drawings, the preferred illustrative embodiments of the present invention are shown in detail. Although the drawings represent some preferred embodiments of the present invention, the drawings are not necessarily to scale and certain features may be exaggerated to better illustrate and explain the present invention. Further, the embodiments set forth herein are not intended to be exhaustive or otherwise limit or restrict the invention to the precise forms and configurations shown in the drawings and disclosed in the following detailed description.

Figure 2:
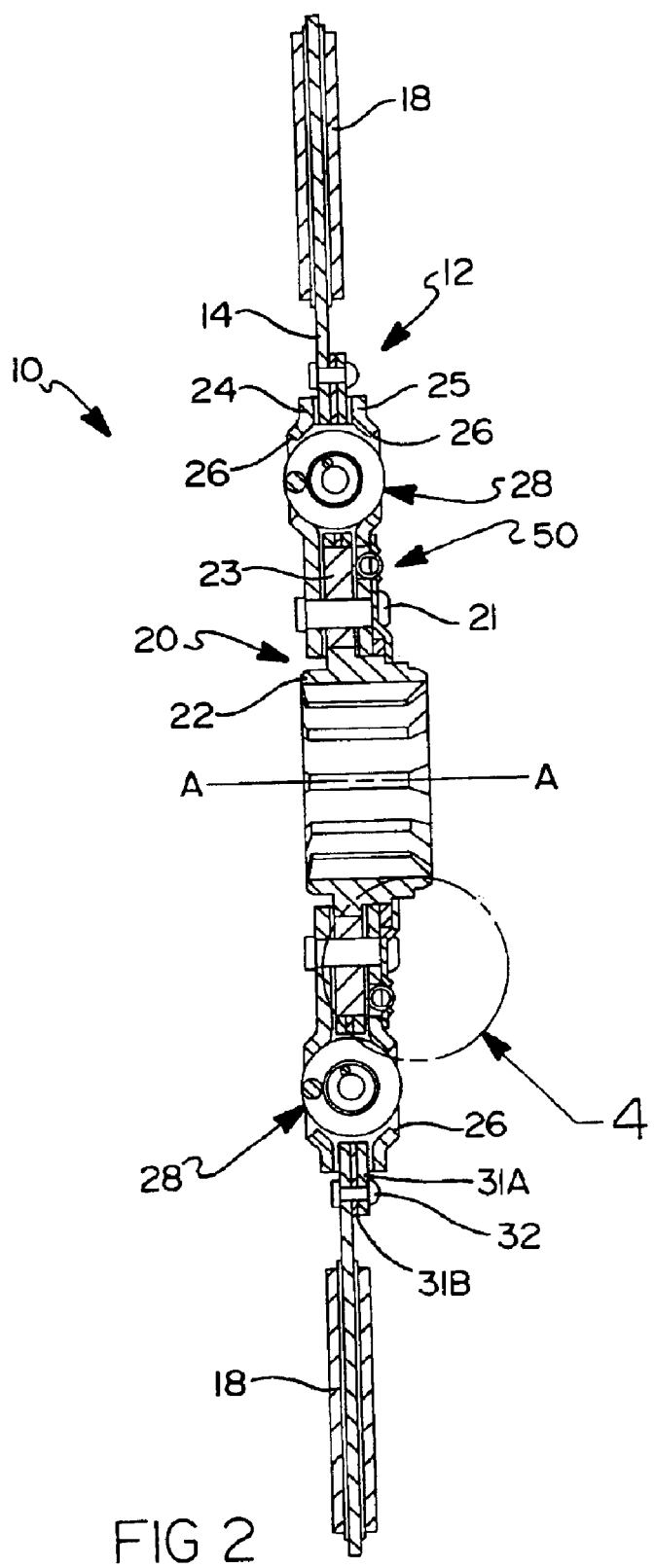
FIG. 2 is a cross-sectional view of the driven disk of FIG. 1 taken along section 2—2, revealing the operative elements of the present invention.

Referring now to FIGS. 1 and 2, a driven disk 10 according to an embodiment of the present invention is shown. Driven disk 10 includes a rotatable disk assembly 12 having a disk plate 14 that includes a plurality of apertures 16. A number of friction pads 18 are attached to disk plate 14 for frictional engagement between a clutch pressure plate and a driving member, such as an engine flywheel. A hub assembly 20 includes an inner hub 22 having spines for slidable engagement with a transmission input shaft (not shown), and an outer hub 23 secured to a pair of spring cover plates 24 and 25. First and second spring cover plates 24, 25 are fixedly attached to outer hub 23 by a plurality of fasteners 21, such as rivets.

Spring cover plates 24, 25 each include a plurality of sockets 26 disposed therein, which are at least partially aligned with apertures 16 in disk plate 14. Sockets 26 may include or may be at least partially defined by an aperture as shown the illustrated embodiment. An energy storage member 28 is disposed within each of the correspondingly aligned apertures 16 and sockets 26 within disk plate 14 and each spring cover plate 24, 25, respectively. In the illustrated embodiment, disk assembly 12 is rotatable relative to hub assembly 20.

Inner hub 22, along with driven disk 10, has an axis of rotation (A—A) and external teeth 29 defining axially extending gaps therebetween (see, e.g., FIG. 3). Outer hub 23 is disposed over inner hub 22 and has internal teeth 30 disposed in the axially extending gaps between external teeth 29 of inner hub 22. The internal teeth 30 of outer hub 23 are smaller than the axially extending gaps, enabling a predetermined amount of relative rotation between inner hub 22 and outer hub 23.

At least one reinforcing plate 31, as shown in FIG. 2, is disposed between disk plate 14 and spring cover plate 25. In a particular embodiment, driven disk 10 includes a disk plate 14 fixedly attached to a first reinforcing plate 31A and a second reinforcing plate 31B by a plurality of rivets 32 positioned radially outward of first and second spring cover plates 24 and 25. Reinforcing plates 31A and 31B include a plurality of apertures 34 and 36, respectively, at least partially aligned with apertures 16 in disk plate 14.

Optionally, driven disk 10 may further include at least one lateral plate 40. In an embodiment, a lateral plate is disposed adjacent each of first and second spring cover plates 24, 25 (see, e.g., FIG. 4). The optional lateral plates 40 are also fixedly attached to outer hub 23 by fasteners 21 and include a plurality of apertures 42 at least partially aligned with apertures 16 in disk plate 14.

Driven disk 10 also includes a predamper 50 having a predamper driving element and a predamper driven element. In the embodiment illustrated in FIG. 4, predamper 50 includes a predamper driven plate 52, which functions as the predamper driven element, and a plurality of energy storage members 54. Second spring cover plate 25 includes a plurality of apertures 56 sized to receive energy storage members 54. When so configured, second cover plate 25 functions as the predamper driving element, eliminating the need for a separate predamper driving plate as required in the prior art. Predamper driven plate 52 is rotatably connected to the predamper driving element (i.e., second spring cover plate 25) by second energy storage members 54.

The annular predamper driven plate 52 is rotatably fixed to inner hub 22. In a particular configuration, predamper driven plate 52 includes a number of inwardly radially extending internal teeth received in corresponding axially extending gaps on inner hub 22, preventing rotation of predamper driven plate 52 relative to inner hub 22. Predamper driven plate 52 also includes a planar base portion 60 disposed against second spring cover plate 25. A series of sockets 62 are disposed through planar base portion 60 in near radial and circumferential alignment with apertures 56 on second spring cover plate 25 to accommodate energy storage members 54. Sockets 62 may include or may beat at least partially defined by an aperture as shown in FIG. 4. A series of holes 64 are dispose through planar base portion 60 radially inward of sockets 62 (see, e.g., FIG. 1); however, a single annular aperture is also possible in place of holes 64. The second series of holes 64, or annular aperture if so configured, are sized to accommodate fasteners 21, particularly movement of fasteners 21 relative to predamper driven plate 52. In an embodiment, a snap ring 66, which is secured in a groove in inner hub 22, axially retains predamper driven plate 52 on inner hub 22.

First energy storage members 28 are disposed within sockets 26 and apertures 16, 34, 36, 42 for absorbing torque as a function of relative rotation between hub assembly 20 and disk assembly 12. In the embodiment illustrated in FIG. 2, a section of second spring cover plate 25 has been removed to reveal energy storage members 28 as a plurality of coil springs, specifically a plurality of outer coil springs 70 and inner coil springs 72. Outer coil springs 70 are operatively disposed between the disk assembly 12 and the hub assembly 20. More specifically, outer coil springs 70 contact disk plate 14 and reinforcing plates 31A, 31B at a first end and first spring cover plate 24 and second spring cover plate 25 at a second end. When so configured, inner coil springs 72 contact lateral plates 40 at a first end and disk plate 14 and reinforcing plates 31 at a second end. As disk assembly 12 rotates relative to hub assembly 20, torque is absorbed as a function of relative rotation between disk assembly 12 and hub assembly 20. Thus, driven disk 10 of the present invention damps torsional vibrations in a driveline as a result of the relative rotation between disk assembly 12 and hub assembly 20. More specifically, as a torsional vibration is introduced to driven disk 10, hub assembly 20 rotates with respect to disk assembly 12, whereby torque spikes are dissipated in the form of heat resulting from friction as the coil springs 70, 72 are compressed and then expand back to their initial state.

Similarly, energy storage members 54 are disposed within apertures 56 and sockets 62 for absorbing torque as a function of relative rotation between outer hub 23 and inner hub 22. In a particular configuration, energy storage members are coil springs that are generally smaller than, and of lower spring rate than, coil springs 70, 72. As a torsional vibration is introduced to driven disk 10, the predamper driving element (i.e., second spring cover plate 25) and outer hub 23 may rotate relative to predamper driven plate 52 and inner hub 22, whereby torque spikes are dissipated in the form of heat resulting from friction as the coil springs (energy storage members 54) are compressed and then expand back to their initial state.

Torsional damping is achieved within the present invention by providing an energy storage component (i.e., energy storage members 28, 54). However, an optional hysteresis component may also be including in driven disk 10 to provide supplemental torsional damping. In an embodiment, an optional hysteresis, or frictional component 80, is provided between predamper driven plate 52 and the predamper driving element (i.e., second spring cover plate 25). The hysteresis component 80 may be a friction pack or other device that increases the surface-to-surface coefficient of friction between the predamper driven plate 52 and second spring cover plate 25. A portion of predamper driven plate 52 may be axially offset relative to planar base portion 60 to accommodate hysteresis component 80. As the load along the axis of rotation A—A increases between the hub assembly 20 and the disk assembly 12, the resulting friction force is increased.

The present invention has been particularly shown and described with reference to the foregoing embodiments, which are merely illustrative of the best modes for carrying out the invention. It should be understood by those skilled in the art that various alternatives to the embodiments of the invention described herein may be employed in practicing the invention without departing from the spirit and scope of the invention as defined in the following claims. It is intended that the following claims define the scope of the invention and that the method and apparatus within the scope of these claims and their equivalents be covered thereby. This description of the invention should be understood to include all novel and non-obvious combinations of elements described herein, and claims may be presented in this or a later application to any novel and non-obvious combination of these elements. Moreover, the foregoing embodiments are illustrative, and no single feature or element is essential to all possible combinations that may be claimed in this or a later application.

What is claimed is:

1. A clutch driven disk, comprising:

a rotatable disk assembly including a disk plate;

a hub assembly including an inner hub and an outer hub, said outer hub rotatable relative to said inner hub and secured to at least one cover plate, said hub assembly rotatable relative to said disk assembly;

a predamper including a driving element and a driven element, said driving element including said cover plate and said driven element including a predamper driven plate fixed to said inner hub, said cover plate including a number of apertures and said predamper driven plate including a number of sockets at least partially aligned with said apertures in said cover plate; and an energy storage member disposed within said apertures in said cover plate and said sockets in said predamper driven plate, said energy storage member configured for absorbing torque as a function of relative rotation between said inner hub and said outer hub.

2. The clutch driven disk of claim 1, wherein said predamper includes a hysteresis component.

3. The clutch driven disk of claim 2, wherein said hysteresis component is positioned between said cover plate and said predamper driven plate.

4. The clutch driven disk of claim 1, wherein said cover plate is secured to said outer hub by a plurality of fasteners.

5. The clutch driven disk of claim 4, wherein said predamper driven plate includes at least one hole through which a portion of said fasteners project, said hole sized to allow movement of said fasteners as said outer hub rotates relative to said inner hub.

6. A clutch driven disk, comprising:

a rotatable disk assembly including a disk plate having a number of apertures, said disk assembly including a number of friction pads attached thereto;

a hub assembly including an inner hub and an outer hub, said outer hub rotatable relative to said inner hub and secured to at least one spring cover plate having a number of sockets, said hub assembly rotatable relative to said disk assembly;

a first energy storage member disposed within said apertures in said disk assembly and said sockets in said hub assembly, said apertures and said sockets being at least partially aligned, said energy storage member configured for absorbing torque as a function of relative rotation between said hub assembly and said disk assembly;

a predamper including a driving element and a driven element, said driving element including said spring cover plate and said driven element including a predamper driven plate fixed to said inner hub, said spring cover plate including a number of apertures and said predamper driven plate including a number of sockets at least partially aligned with said apertures in said spring cover plate; and a second energy storage member disposed within said apertures in said spring cover plate and said sockets in said predamper driven plate, said second energy storage member configured for absorbing torque as a function of relative rotation between said inner hub and said outer hub.

7. A clutch driven disk, comprising:

a rotatable disk plate having a number of apertures, said disk plate having a number of friction pads attached thereto;

a hub assembly including an inner hub and an outer hub;

a first spring cover plate and a second spring cover plate each coupled to said outer hub for rotational movement therewith, said spring cover plates having a number of sockets;

an energy storage member disposed within each of said apertures in said disk plate and said sockets in said spring cover plates, said apertures and said sockets being at least partially aligned, said energy storage member configured for absorbing torque as a function of relative rotation between said disk plate and said hub assembly;

a predamper including a driving element and a driven element, said driving element including said second spring cover plate and said driven element including a predamper driven plate fixed to said inner hub, said second spring cover plate including a number of apertures and said predamper driven plate including a number of sockets at least partially aligned with said apertures in said second spring cover plate;

a second energy storage member disposed within said apertures in said second spring cover plate and said sockets in said predamper driven plate, said second energy storage member configured for absorbing torque as a function of relative rotation between said inner hub and said outer hub; and a hysteresis component positioned between said second spring cover plate and said predamper driven plate.

* * * * *